Sept. 7, 1965  J. W. I. HEIJNIS  3,204,505
FIBER CUTTER
Filed Aug. 28, 1963

INVENTOR.
JAMES WATT IJSBRAND HEIJNIS
BY Robert W. Habel
ATTORNEY

United States Patent Office 3,204,505
Patented Sept. 7, 1965

3,204,505
FIBER CUTTER
James W. I. Heijnis, Arnhem, Netherlands, assignor to American Enka Corporation, Enka, N.C., a corporation of Delaware
Filed Aug. 28, 1963, Ser. No. 305,166
Claims priority, application Netherlands, Sept. 12, 1962, 283,161
1 Claim. (Cl. 83—282)

This invention relates generally to apparatus for producing short staple fibers and more particularly to an improved fiber cutter for cutting a bundle or tow of continuous filamentary material into short discontinuous lengths.

Fiber cutting devices are well known which have a movable blade for passage in front of the outlet of a tow supply channel, said channel being defined by a fixed wall and movable clamping device. Such cutters are often used for producing short staple fibers or very short fibers for use in the manufacture of paper. In the operation of this known type cutting device, a thick tow of filamentary material is held in the supply channel by the clamping device while the movable blade cuts off a slice of fibers from the free end of the tow projecting from the channel opening. After the blade has cut through the tow, it returns to its original position, the clamping device is released, and the tow is then advanced one fiber length in the channel whereupon the tow is again clamped in position and the cutting operation repeated. The blades of such cutters may have straight or curved cutting edges and many move in a reciprocating path or a series of blades may be employed operating in a rotary path. Alternatively, the blades may be stationary with the channel reciprocating or rotating. The tow supply channel of such devices is disposed and opens at a right angle to the path of the cutter blade. Numerous other cutting devices are known in which the tow channel is merely bored from a solid piece and either rotates or reciprocates in the path of a cutter or is stationary with the cutter moving adjacent the channel opening.

An important factor in fiber cutters is the edge life of the blades, edge life being defined as the time the blades remain sufficiently sharp to produce the desired cutting action and satisfactory fiber product. It has been found that the edge life of the known fiber cutters is relatively short. Furthermore, it is sometimes difficult to feed the tow through the channel and fibers of unequal lengths are many times produced due to unequal advancement of all of the filaments in the tow.

Accordingly, it is an object of this invention to provide a fiber cutter not having the aforementioned disadvantages.

Another object of this invention is to provide a fiber cutter with a substantially prolonged edge life over the cutting devices of the prior art.

Still another object of this invention is to provide a cutting device which will produce short fibers of substantially equal length.

A further object of this invention is to provide a fiber cutting device in which all of the filaments of the tow are advanced equally during feeding to the cutter.

Another object is to provide a fiber cutting device with a filament supply channel that is not difficult to feed.

The above objects are satisfied in accordance with this invention by modifying the known type fiber cutting devices such that instead of the tow supply channel being disposed perpendicular to the path of the cutter blade, the channel is positioned obliquely or slightly off from perpendicular to the path of the blade and pointed against the direction of cutting. In one embodiment, the angle between the channel path and a line drawn perpendicular to the path of the blade is about 10°. Larger or smaller angles may be used, depending upon the results desired.

Without intending to be limited thereby, one explanation for the improved results obtained with the cutting device of this invention is as follows. During cutting, the tow is slightly compressed under the edge of the blade such that in the cutting plane the filaments are slightly bent in the direction of cutting. In the prior art apparatus, the tow channel opens at a right angle to the blade path, with the result being that the bent filaments do not project as far from the opening. As soon as the filaments are cut, their free ends try to move into their original straight position and thus have a tendency to project further from the channel opening. Consequently, the cut tow exerts a pressure on the side of the blade facing it, the pressure being exerted on the side of the blade both during cutting and return of the blade to its original position. Inspection of the cut end of the tow has shown that it bulges beyond the face of the channel opening. Furthermore, the friction between the blade and tow produces considerable heat and thus decreases the quality of the fiber product. This pressure leads to irregular displacement of the filaments within the tow which in turn produces a non-uniform fiber product together with feeding difficulties. However, when the tow supply channel is disposed obliquely in accordance with this invention, it is found that the cut tow does not bulge from the opening, but instead forms a more or less concave depression inside the channel opening. Consequently, the cut ends of the tow no longer exert any pressure against the face of the blade, thus eliminating the heat of friction concomitant with the prior art cutting devices. A further advantage of the instant device is that smaller clearance tolerances may be employed between the movable blade and the tow channel face, which in turn also reduces the number of fibers of unequal length.

It has been found that operation of the cutting device is improved if the tow is uniformly fed and adequately clamped. According to one embodiment of this invention, a clamping device defining one side of the feed channel is modified such that about 4 millimeters from the opening it recedes gradually preferably at an angle of about 10° to the perpendicular of the blade path thus providing a constricted section immediately adjacent the channel opening for securely clamping the tow and providing an enlarged area in the channel for easy feeding. With this arrangement, the channel walls are parallel about four millimeters back from the channel opening and from there on back the channel widens in the manner above indicated. In order to reduce the percentage of long fibers to a minimum. it is desirable that the clearance between the blade and the face of the channel opening be kept as small as possible . Since the clamping device must be movable and placed in guides with some transverse play, it is very difficult to obtain a sufficiently small clearance between the blade and the side of the clamping device facing the blade if it is positioned on the side of the channel to which the blade moves in operation. Therefore, if the clamping device is positioned on the channel side at which the blade begins its cutting movement, the clearance may be reduced to a minimum.

It has also been found that an additional improvement may be obtained in the cutting operation if the cutting device of this invention is designed such that the wall of the channel toward which the blade moves during cutting has a concave, or preferably elliptical, shape with a maximum radius of curvature smaller than that of the blade edge.

Other objects and advantages will become apparent from the following detailed description of one embodiment of the invention taken in conjunction with the accompany drawing wherein.

Figure 1:
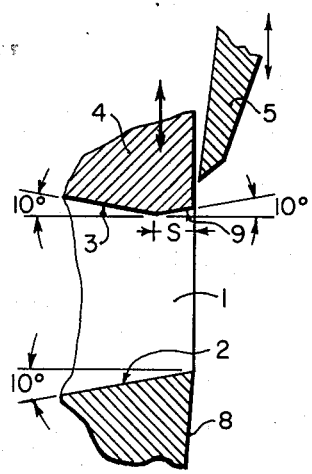
FIGURE 1 is a view in cross section showing part of the end of the tow supply channel and blade taken along line I—I of FIGURE 2.
Figure 2:
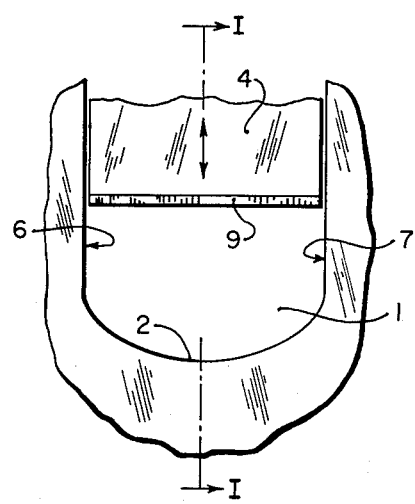
FIGURE 2 is a plan view showing the face of the supply channel where it opens into the path of the cutter.

Referring now to FIGURES 1 and 2, the numeral 1 designates the channel for guiding a tow (not shown), said channel being defined by fixed channel wall 2 and the lower side 3 of a clamping device 4. The clamping device is movable up and down in guides (not shown) in the direction indicated by the arrow. The opening of channel 1 lies in a flat plane. Parallel with and in front of said plane, at a distance therefrom of only a few microns, a blade 5 reciprocates up and down in a vertical direction as indicated by the arrow. Blade 5 has a straight cutting edge. The fixed lower channel wall 2 is elliptically shaped. The driving systems for the clamping device 4, the blade 5, and the feeding systems for periodically advancing the tow through channel 1 of the outlet are of conventional construction and are not shown.

The vertical walls 6 and 7 of the supply channel 1 run parallel to each other and perpendicular to the plane of the opening. The lower wall of the channel is inclined upward and makes an angle of about 10° with a line drawn perpendicular to the plane of the opening. The edge of said lower wall 2 acts as the cutting edge of a stationary lower blade. The face surface 7 forming said cutting edge recedes from the plane of the opening through a clearance angle of only a few degrees.

The lower side 3 of the clamping device 4 is mainly a flat surface which runs obliquely downwards at an angle of about 10° to a line drawn perpendicular to the plane of the opening. Thus, surface 3, together with the lower wall 2, form a progressively narrowing channel in the direction of feed. The surface 9 of the lower side of clamping device 4 nearest the opening is disposed so that it runs parallel to the lower wall 2 for a distance S of about 4 millimeters. Consequently, the last section of the channel 1 has a constant diameter and opens obliquely upwards pointed against the cutter path. Therefore, immediately before the filaments of the tow are cut, they project obliquely upwards from the opening at an angle of about 10° to a line drawn perpendicular to the cutter path.

Figure 3:
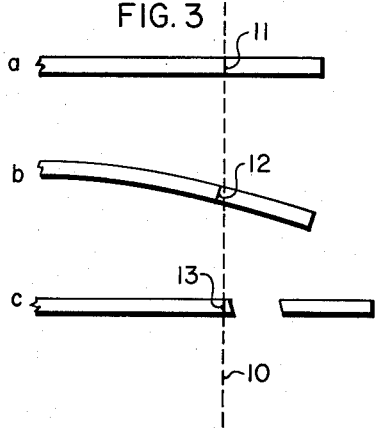
FIGURE 3 is a schematic view showing a typical filament in three stages of the cutting process carried out by the cutting devices of the prior art.
Figure 4:
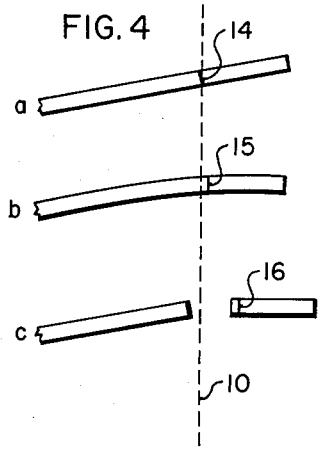
FIGURE 4 is a corresponding schematic view showing three stages of a typical filament in the cutting process carried out by the cutting device of the invention.

FIGURES 3a and 4a represent respectively the position of a filament in the prior art apparatus and in the apparatus of this invention before the blade 5 begins to cut through the tow. FIGURES 3b and 4b represent the same filaments immediately before they are cut, and FIGURES 3c and 4c show the filaments after the blade has been withdrawn. The path of the blades is indicated by the dash lines 10. Various positions of the filament cross section are indicated at 11, 12 and 13 in FIGURE 3 and 14, 15 and 16 in FIGURE 4, said cross sesction being in the blade path 10 when the filaments are in the positions 3a and 4a, respectively.

When the horizontal filament of FIGURE 3 is bent into the position b by the action of the blade, the cross section moves from position 11 to position 12, which is slightly on the left of the path 10. In that position the filament is cut to the right of the cross section. After the blade has cut through the filament, the remainder of the filament springs back, as shown in FIGURE 3c. The figure clearly shows that the remainder of the filament projects from the opening beyond the blade path 10. During cutting and during the upward stroke of the blade this filament together with the other cut filaments of the tow rub vigorously against the side of the blade, thus causing serious wear.

FIGURE 4 shows the improvement in cutting produced by the apparatus of the invention. The filament is cut at a point to the left of the cross section. Therefore, after the filament has been cut, it springs back in such a manner that it recedes from the blade, so that further contact with the blade is eliminated.

The various angles and dimensions mentioned in the foregoing description may be varied to find optimum values for the cutter, depending upon the size of the tows and/or filaments to be cut and the material from which the tow is made. In this connection, the angle at which the channel 1 opens and the length of distance S may be varied. Such variations, however, do not affect the basic principle of the invention.

While a preferred embodiment of the invention has been shown, it is to be understood that numerous alterations and variations may be made without departing from the spirit and scope of the invention. It is, therefore, intended to be limited only to the extent set forth in the following claim.

What is claimed is:

A device for cutting a plurality of filaments in the form of a tow into discontinuous lengths comprising a channel formed by a fixed element and a clamping means, a cutter blade adapted for movement across the outlet orifice of said channel through which a plurality of filaments are fed simultaneously, a first portion of said channel having converging walls and a channel axis perpendicular to the path of movement of said cutter blade, a second portion of said channel connecting said first portion with said orifice, the channel axis of said second portion forming an acute angle to a line drawn perpendicular to the path of the cutter blade and pointed against the direction of cutting, said second portion having a uniform cross section, and said clamping means cooperating with said fixed element to secure said filaments during cutting thereof.

References Cited by the Examiner

UNITED STATES PATENTS

| 1,655,471 | 1/28 | Marcell | 83—282 |
| 2,391,637 | 12/45 | McEwen | 83—580 |
| 3,104,579 | 9/63 | Blankenship et al. | 83—580 |

FOREIGN PATENTS

| 1,069,753 | 7/54 | France. | |

ANDREW R. JUHASZ, *Primary Examiner.*

LEON PEAR, *Examiner.*